United States Patent [19]

Edgerton et al.

[11] 3,754,440
[45] Aug. 28, 1973

[54] HELICOPTER LIFT MARGIN DETERMINING SYSTEM

[75] Inventors: Bradford W. Edgerton, Lynnfield; Sidney B. Williams, Lexington; Vernon C. Westcott, Lincoln, all of Mass.

[73] Assignee: The United States of America as represented by the Secretary of the Navy, Washington, D.C.

[22] Filed: Aug. 16, 1972

[21] Appl. No.: 281,079

[52] U.S. Cl. ............................ 73/178 H, 235/150.2
[51] Int. Cl. ............................................ G01c 21/00
[58] Field of Search ...................... 73/178 H, 178 T, 73/178 R, 116; 235/150.2, 150.22

[56] References Cited
UNITED STATES PATENTS
3,616,691   11/1971   Brandau............................ 73/178 H

*Primary Examiner*—Donald O. Woodiel
*Attorney*—R. S. Sciascia, L. I. Shrago et al.

[57] ABSTRACT

A system for determining in flight and continuously indicating to a helicopter pilot the lift margin of his craft is provided. Life margin as applied herein is the difference between the maximum available lift and the effective gross weight, both expressed in pounds, and is obtained from the ratio of lift to horsepower and the variation of the relative performance of the engine under ambient conditions. Input parameters of topping torque, hover torque, outside air temperature, static pressure, fuel weight, and rotor speed are both theoretically and empirically derived and combined to obtain maximum available lift and effective gross weight.

8 Claims, 6 Drawing Figures

HELICOPTER LIFT MARGIN DETERMINING SYSTEM

The present invention concerns means for determining and displaying helicopter load capacity and, more particularly, a method of and means for continuously and automatically computing and displaying to a helicopter pilot the lift margin and other parameters concerning his craft under anticipated changes in ambient conditions.

Although helicopter performance can be ascertained from published charts and slide rules or hand computers, ambient conditions and the operating condition of the aircraft not only change rapidly but are such that the helicopter pilot is often unable to assess present or anticipated aircraft performance due to the pressure of his other duties. Among the several variables which a helicopter pilot must be aware of is the critical one of helicopter lift margin, which is defined as the difference between maximum available lift and effective gross weight, both expressed in pounds.

The continuous determination of lift margin during flight requires the implementation of two relationships, the ratio of lift to horsepower and the variation of relative performance of the engine under changes in ambient conditions. When a helicopter pilot has these functions available, the determination of aircraft weight and of maximum available lift becomes a matter of collecting and processing the appropriate input parameters. The in-flight determination of lift margin is facilitated, fortunately, by the circumstances that the helicopter ratio of lift to horsepower is relatively fixed, and engine performance is a well documented function of ambient pressure and temperature.

Lift margin is a very critical quality, especially in areas where loads are carried from places of low pressure to places of high pressure and vice versa, while its computation is the algebraic difference between the errors in the maximum available lift computation and the effective gross weight computation. The latter two computations are made by operating on the input parameters of topping torque, hover torque, outside air temperature, static pressure, fuel weight, and rotor speed, using both theoretically and empirically derived relationships between these input parameters and lifting force.

The two basic parameters of maximum available lift and effective gross weight are similar and use similarly derived input parameters. However, where a elicopter is carrying a load which is slightly below the maximum weight under ambient conditions in which the helicopter will hover only, extreme care must be taken in determining the values of the two inputs. This will be more apparent when one also considers the allowable percent of error in such computations and estimations. For example, if the maximum available lift of a craft is on the order of 9,000 pounds and the effective gross weight is on the order of 8,500 pounds, an allowable error of ±5 percent in both of these quantities could reduce the estimated maximum available lift to a value less than the effective gross weight if such errors are applied in opposite sign.

Conventionally, the maximum available lift and effective gross weight parameters are determined by different computational apparatus so that the foregoing application of errors in opposite sign can be possible and can be displayed to a pilot in a critical situation to indicate no lift margin or a lift margin of about 900 lbs whereas, in fact, the lift margin is about 500 lbs which is near the limit of that required to accomplish a current purpose. The present invention provides a method of and means for computing both the maximum available lift and the effective gross weight in such a way that allowable errors are balanced out, rendering the system a reliability which cannot be approached by systems wherein these parameters are developed independently. The foregoing critical parameters as well as other parameters which must be derived are determined by a compact, light-weight computer and displayed to the pilot.

Accordingly, it is an object of the present invention to provide a helicopter lift margin system wherein it is not possible to combine allowable errors of opposite sign in determining the difference between essential parameters.

It is another object of this invention to provide a system for computing lift margin using selected approximations which may be either fully automated or may permit manual inputs of essential data, and for displaying pertinent parameters for the pilot's instant review.

It is a further object of this invention to provide a helicopter lift margin system wherein the expected error is less than the root mean square of errors in the maximum available lift computation and the effective gross weight computation.

Other objects, advantages and novel features of the invention will become apparent from the following detailed description thereof when considered in conjunction with the accompanying drawings in which like numerals represent like parts throughout and wherein:

Maximum available lift is the largest lift at hover which can be generated under existing ambient conditions while effective gross weight is the aircraft gross weight plus any penalties accrued because of degradation of the lifting system, i.e., the transmission and rotor. Maximum available lift is determined from a knowledge of maximum available torque, the known dependence of available engine torque upon ambient temperature and pressure, and the known relationship between available torque and lift. Thus, maximum available lift is determined by correcting peak available power for the local ambient, and computing the available lift from this power. The ratio of lift to power is little (±5 percent) affected by the normal range of power and air density; it is rather the degradation of engine capability with increases in either altitude or air temperature that accounts for the well-known variation of helicopter performance with ambient.

Effective gross weight is determined by taking the ratio of hover power to power-to-lift ratio. The power-to-lift ratio is designed into the computer and so does not change with regard to transmission/rotor degradation. The weight so determined is an effective one. That is, if a certain increment of power is required to maintain hover capability, then that power increment is, in effect, a weight penalty. This amount increases the effective gross weight, because the corresponding power is not available for hovering; it reduces lift margin by just the amount of the weight penalty.

The determination of lift margin, once engine capability and effective gross weight are known, is a relatively straightforward matter in that both engine capability, at standard conditions, and effective gross weight, corrected for fuel on board at time of weight determination, are stored and continuously updated so that lift margin may be displayed. Because the basic information is stored, the computation of lift margin can be made at any time, that is, during any maneuver, or even while the aircraft is parked. Updating includes corrections for weight changes, i.e., cargo, personnel or fuel, and corrections for changes in ambient conditions, i.e. static pressure, and outside air temperature. The result of the computation could be displayed to the pilot without further elaboration. But in computing this information, other parameters such as effective gross weight which must be derived continuously are also available for display. Since weight is so fundamental, effective gross weight is displayed adjacent to lift margin since it is believed that there might be times when the pilot's confidence as to the amount of lift margin might well be substantiated by the presentation of effective gross weight, a parameter for which he would probably have a reasonable current estimate.

Figure 1:
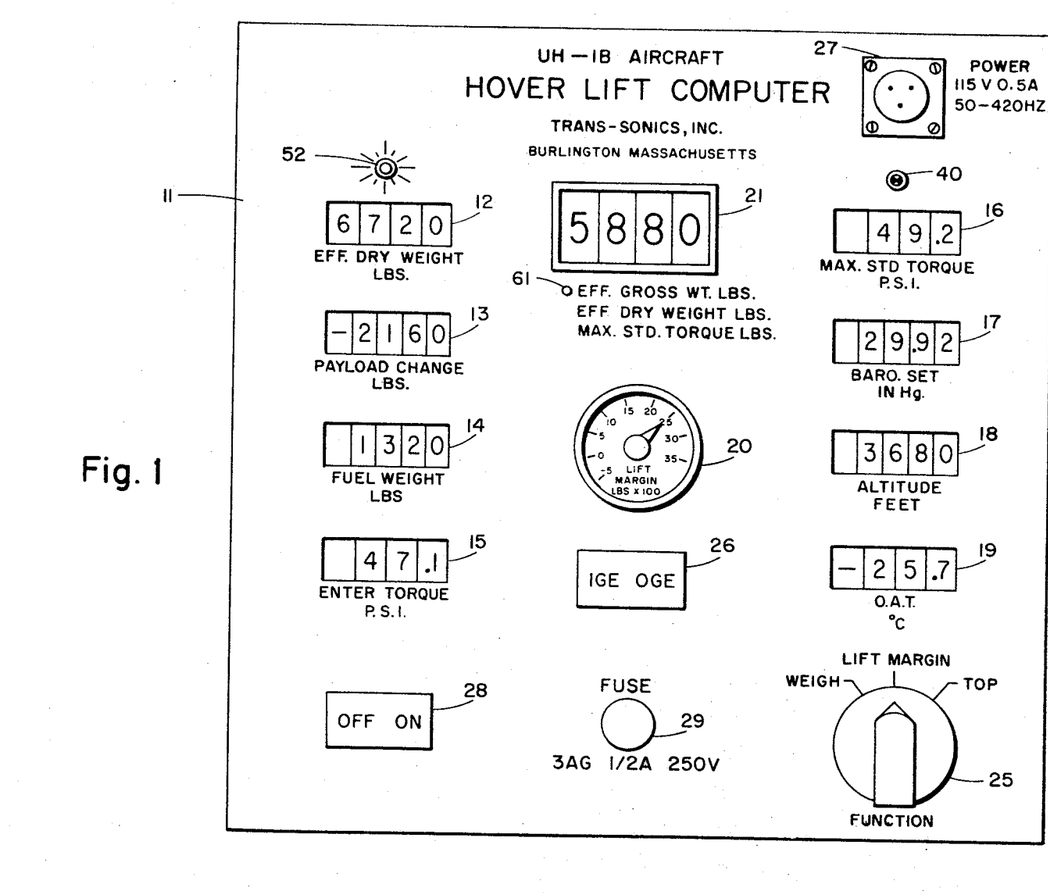
FIG. 1 is a front elevation of the display panel layout of the hover lift computer of the present invention.

The hover lift computer whose display panel 11 is shown in FIG. 1, serves as both a check list and an analog computer to derive for the pilot the operating lift parameters he must known. In so doing, the same data as would be required for a handbook solution is entered into the computer, for a solution to be realized. Certain parameters, such as the ambient and the weight of the on-board fuel, chang appreciably; others change very little or not at all, such as effective dry weight and barometer setting. In all, however, there are eight parameters to be entered, as follows:

$W_N$ = Effective Dry Weight, lbs. indicated at 12. This is the aircraft effective gross weight less the fuel weight ($EGW - W_{FU}$). It is set into the appropriate thumbwheel by the operator after reading it from the digital display in the WEIGH mode. Ambient altitude and temperature data, corresponding to the time of weighing are used in the appropriate parameter inputs.

$W_C$ = Payload Change, lbs. indicated at 13. This is the weight added or subtracted since weighing.

$W_{FU}$ = Fuel Weight, lbs. indicated at 14. This is the fuel weight as indicated by the aircraft panel meter.

$Q_E$ = Enter Torque, psi. indicated at 15. This is the hydraulic pressure as indicated by the torquemeter gage at the time of topping.

$Q_{MS}$ = Maximum Standard Torque, psi. indicated at 16. This is the torquemeter reading corrected (by the computer) to standard conditions. It is set into the appropriate thumbwheel by the operator after reading it from the digital display in the topping (TOP) mode. Ambient altitude and temperature data, corresponding to the time of topping are used in the appropriate parameter inputs.

$P_B$ = Barometer Setting, inches of mercury, absolute. indicated at 17. This is the barometer setting as read from the altimeter dial. It must correspond to the altimeter reading for whatever altitude is being set into the computer.

H = Altitude, feet. indicated at 18. This is the altimeter reading in feet, and must represent the altimeter reading for whatever (WEIGH, LIFT MARGIN, or TOP) function is being performed.

OAT = Outside Air Temperature (OAT), deg C. indicated at 19. This is the OAT reading as seen by the pilot. It must represent the thermometer reading for whatever (WEIGH, LIFT MARGIN, or TOP) function is being performed.

Lift margin (LM) is presented at 20 as an analog display, and effective gross weight (EGW) is presented concurrently at 21 as a digital display. When effective dry weight (effective gross weight less fuel weight) and maximum standard torque (maximum available torque corrected to standard conditions) are to be stored, these two parameters may be serially presented on the digital display in lieu of EGW so that the operator can read them and then enter them in manually set, thumbwheel, memories. Other parameters not otherwise available such as, perhaps, engine compressor-inlet temperature, if that were used as an input could also be displayed since these parameters are digitized in the same way as the parameters shown. The parameters indicated at 12–19 are entered in the present embodiment by the respective thumbwheel switches on the computer panel and are converted to electrical signals in a conventional manner. It will be appreciated that conventional sensors could be substituted for the manual switches within the scope of the invention.

Effective dry weight 12 is one of two parameters which are presented on the digital display, rather than on the aircraft instrument panel. The other is maximum standard torque. The effective dry weight is set into a conventional linear decade resistance circuit, not shown, such that a voltage proportional to $W_N$ is produced. The scale factor is 1 ohm per pound, and the range is from 4,000 to 8,990 pounds for the UH-1B aircraft. This circuit includes resistance elements corresponding to $W_{FU}$, Fuel Weight, so that these two parameters may be added.

Payload change, 13, is set into the appropriate thumbwheel from data known or estimated at a time, after weighing, when cargo or personnel are loaded or unloaded, and so provides an input for the implementation of the appropriate equation. The scale factor is again 1 ohm per pound, but the sign is controlled by the thumbwheel switch. The range is from −3,990 pounds to +3,990 pounds. Payload change is set to zero at the time of weighing.

Fuel weight, 14, is read from the aircraft instrument panel and set into the appropriately marked thumbwheel. Switching is provided to present $W_{FU}$ with the proper sign in the following two operations:

$$W_N = (EGW)_W - (W_{FU})_W \qquad (1)$$

$$EGW = W_N + W_C + W_{FU} \qquad (2)$$

where the subscript, $W$, restricts the so-marked parameters to their values at the time of weighing. The scale factor is 1 ohm per pound, and the range is from 0 to 1,990 pounds.

Enter torque, 15, is the value of torque, expressed as torquemeter hydraulic pressure, observed at the time of topping. It is set into the appropriate thumbwheel switch, as a resistance with a scale factor of 1 ohm per 0.01 pound per square inch torquemeter pressure. Because it is not corrected to standard conditions, it is not a quantitative measure of engine potential. The scale is 10.0 to 49.9 psi.

Maximum standard torque, 16, is the value of topping torque, 15, corrected to standard conditions, 29.92 inches of mercury absolute pressure and ±15°C outside air temperature. Because this correction is made, this parameter is indeed a quantitative measure of engine potential and so is a measure of engine condition. As such it could also be used for maintenance purposes.

The torque correction is derived from the appropriate engine specification wherein the available torque is proportional to the absolute static pressure and a term $(1-kT)$ where $k$ is a constant taken as $-0.00556$, and $T$ is the outside air temperature, 19. A further proportionality factor is introduced to normalize this function upon the standard conditions of sea level and ±15°C.

In the hover lift computer, maximum standard torque is derived from enter torque by modifying the reference voltage $E^*$ as later derived in proportion to the change in engine performance caused by the variation of the ambient from standard conditions. Thus, if only 75 percent of the standard conditions torque would be expected, the value of enter torque would be digitized based upon 75 percent of the reference voltage, and the digitized value would be multiplied appropriately by 133 percent to display the maximum standard torque. The operator reads the display and adjusts the maximum standard torque thumbwheel to equality.

The scale factor and range for maximum standard torque are the same as for enter torque, 1 ohm per 0.01 psi, and 10.0 to 49.9 psi.

In the computation of maximum available lift, it is conceivable that the theoretically available, or even actually available, engine torque might exceed that which may be transmitted mechanically with safety. To provide for the fact that this above-maximum torque can never be used in the computation of lift margin, an electrical limiter, diode circuit, is provided to prevent the computed torque from ever exceeding that corresponding to 50 psi on the pertinent torquemeter.

Barometer setting, 17, is the actual setting of the aircraft altimeter, and refers to the sea-level value of barometric pressure for the indicated altitude. In the measurement of altitude, the barometer adjustment is used to rotate the altimeter mechanism within the case so that the shaft input to the gearing for the indicator hands is linearly rotated to make sea-level pressure, 29.92 inches of mercury, correspond to zero altitude. The barometric scale is calibrated in terms of the sea-level pressure departure from standard. Thus, when the ambient pressure is 1 inch of mercury lower than normal, the setting knob must be rotated until 28.92 shows in the appropriate window in order to restore the reading to zero altitude. This is equivalent to saying that a barometric departure at sea level is propogated throughout the atmosphere, an assumption which is obviously false because the departure can easily exceed the total pressure at certain high altitudes. However, this assumption, which does not preclude the use of aneroid altimeters for navigation, is of no concern if such devices can be used to measure pressure. This reasoning may be made clearer in terms of an algebraic notation:

$$H_{indicated} \; 32 \; f(P_s).$$

(3)

Here the NASA "standard day" altitude is defined in terms of the nominal "indicated" altitude, $H_{ind}$, and the static pressure, $P_s$. One tacit assumption is that the pressure at sea level is the standard value, $P_o$. It has been noted that the barometric setting knob merely rotates the altimeter mechanism such that when the indicated altitude is zero, the setting mechanism reads the ambient pressure. That is, the relationship of equation (3) always holds, provided that the barometric setting knob is set to read 29.92 inches of mercury or $$P_s = f^{-1}(H_{ind}); \; P_o = 29.92 \text{ in Hga}.$$

(4)

Equation (4) shows that the measurement of static pressure can be accomplished by reading the indicated altitude, and then relating this height to pressure by means of standard tables — provided that the barometric setting is 29.92 inches of mercury. Thus, a modification of equation (4) is required to express the contribution of the setting knob:

$$P_s = f^{-1}(H_{ind}) + P_B - P_o$$

(5)

where
$P_B$ = indication of barometric setting knob,
$P_o$ = standard sea level pressure (29.92 in Hga), the remaining variables having been previously defined.

Equation (5) shows that it is possible to obtain static pressure from the altimeter exactly and unambiguously by means of a simple offset equal to the indicated departure from the sea level standard pressure. It follows that equation (3) can be rewritten by a derivation from equation (5):

$$H_{ind} = f(P_s - P_B + P_o)$$

(6)

While equation (6) is not necessary for a reading of static pressure from the face of the altimeter, it presents the consequences of the foregoing assumptions.

The parameter required for altitude correction, 18, is actually static pressure, as neither the engine nor the rotor can be sensitive to altitude. The hover lift computer utilizes the aircraft altimeter to sense static pressure; the altimeter is essentially a non-linear pressure gage for which a pressure must exist for each combination of its indicated altitude and barometric setting. If the barometric setting were always left at its standard value of 29.92 inches of mercury, then the altitude — pressure relationship would simply be that of the U. S. Standard Atmosphere; when the barometric setting differs from its standard value, the pressure is corrected equally. Thus, if the barometric setting knob were set at 30.92 inches of mercury, the true pressure applied to the altimeter would be 30.92 – 29.92 or 1.00 inch of mercury greater than that corresponding to the pointer altitude as interpreted by the U. S. Standard Atmosphere. Of course, the barometric setting of the altimeter can be used to derive the static pressure without regard to the true sea-level barometric pressure; thus, it could be left set at some convenient point, for instance, the nominal sea-level pressure, except that such a procedure might interfere with its normal use in navigation.

In converting altimeter readings to static pressure, the function of the hover lift computer is such as to produce a variable resistor with a scale factor of 1 ohm per 0.01 inch of mercury absolute pressure. This is accomplished by making up a set of variable resistors: one for the barometric setting, and three for the altitude reading. The barometric setting and the "tens" switch of the altimeter are "decades" connected in series, but the "thousands" and "hundreds" switches are non-linear and linear decades, respectively, connected in parallel, and this combination is wired in series with the other two elements. Other arrangements, such as a Kelvin-Varley divider operating on a fixed voltage may also be employed to convert altitude to an electrical pressure signal. A voltage proportional to the "pressure" resistance, and normalized on the nominal sea level value of pressure, is generated to produce a signal proportional to static pressure. The range of altitude of the computer is 0 to 9,990 feet.

Concerning outside air temperature (OAT), 18, temperature affects both engine and rotor performance, as does static pressure. However, these effects are different enough to warrant two separate temperature channels, T and T*, where the asterisk refers to the effect upon engine (torque) performance. (Parameters designated P* and E* likewise refer, respectively, to the pressure effect upon engine torque, and to a voltage modified from the standard voltage, E, in porportion to the combined effect of pressure and temperature upon engine torque). Rotor performance is but slightly affected (less than 10 percent) by the ambient conditions, so it is practical to lump temperature and pressure into one variable, the normalized atmospheric air density, $\sigma$, which has a value of unity at standard conditions. Engine performance is much more sensitive to ambient conditions, and so T*, the engine torque parameter, is separately processed. A reason that static pressure need not be similarly treated is that both density and engine torque are directly proportional to pressure. On the other hand, temperature is required in the inverse absolute form for producing the density signal, but as a negative coefficient first power for producing the torque correction.

Temperature, at least as set in by the hover lift computer operator, is unique in that it contains zero within its range (−49.9 to +49.9). For thumbwheels to pass through zero, a circuit is used which requires switching at zero, and this is done by means of the polarity element. The total number of resistors required for the 998 discrete settings is 24. Thus, 24 resistors are used for T, and 24 more are used for T*. To produce the absolute value of T, an extra resistor is added such that the absolute value corresponds to 273K at 0 deg C. The scale factor for T* is 1 ohm per 0.05 deg C, and the scale factor for T is 1 ohm per 0.10 deg C. Both functions use the same (OAT) thumbwheel; the range is from −49.9° C to +49.9° C. A function switch 25 provided for computer operation in determining maximum standard torque (TOP), effective dry weight (WEIGH) or lift margin. Another switch indicated at 26 provides for selection betweeen in ground effect (IGE) and out of ground effect (OGE). This switch is set at IGE when lift margin in ground effect is to be displayed and at OGE when maximum standard torque and effective dry weight are to be determined. A power supply receptacle 27, an ON-OFF switch 28 and a fuse 29 complete the items on panel 11.

Helicopter lift margin (LM) is defined as the difference between maximum available lift (MAL) and effective gross weight (EGW). The accuracy with which lift margin can be determined by the lift computer is, therefore, dependent upon the accuracy with which the lift computer can determine maximum available lift (MAL) and effective gross weight (EGW). To enable the computation of MAL and EGW under a given set of ambient conditions, it is necessary to have two constants stored in the computer, namely, maximum standard torque ($Q_{ms}$) and effective dry weight (EDW). $Q_{ms}$ is the maximum torque that the particular engine on board the particular helicopter in question can develop at zero pressure altitude (29.92 in.) and 15°C outside air temperature, and is determined at topping by the following formula:

$$Q_{ms} = Q_T (P/P_u) \; 116^{-1} (K_1 + K_2 T)^{-1}$$

(7)

where
$Q_T$ = topping torque in psi
$P$ = pressure in inches of mercury
$P_o$ = standard pressure (29.921 in. Hg)
$T$ = temperature in °C
$K_1$ = 1.0834
$K_2$ = 0.00556

EDW is the difference between effective gross weight (EGW) and fuel weight ($W_{FU}$). EGW is determined from the following theoretically and empirically derived relation:

$$EGW = K_6 K_7 N Q_w + K_8 (P/P_o)(K_3 + K_4 T)^{-1}$$

(8)

where
$Q_w$ = torque at weighing in psi
$N$ = engine rpm
$K_3$ = 0.9469
$K_4$ = 0.003472
$K_6$ = 0.00352
$K_7$ = 6.493 and $K_8$ = 2225 for $\Delta W/\Delta P$ ratios of from about 40 to about 58
or
$K_7$ = 7.639 and $K_8$ = 1,325 for $\Delta W/\Delta P$ ratios of from about 62 to about 100

LM is determined for the following theoretically and empirically derived relation:

$$LM = K_6 K_7 N Q_{ms}(P/P_o)(K_1 + K_2 T) + K_8(P/P_o)(K_3 + K_4 T)^{-1}$$

(9)

The constants $Q_{ms}$ and $EDW$ are determined by performing certain maneuvers with the helicopter, and once so determined are entered into the computer wherein they remain constant throughout all subsequent computations of lift margin. Since the computation of LM is made by using the stored constants $Q_{ms}$ and EDW, it is evident that the accuracy of the resulting LM computation depends upon the accuracy of the stored constants, as well as the acccuracy of the computer mechanization. The accuracy of the computer mechanization is determined by comparison with actual values. If the computer mechanization operates on the stored value of $Q_{ms}$ such that the maximum available torque ($Q_A$) is computed at arbitrary values of altitude and temperature, and a large number of values of $Q_A$ so calculated are compared with actual measured values of $Q_A$, and there is close agreement, then it can be concluded that the stored value of $Q_{ms}$ must be accurate and the mechanization of the $Q_A$ calculation must be accurate.

In like manner, if the computer mechanization which computes lifting force as a function of engine torque, engine rpm, ambient temperature, and altitude yields a lifting force which is proportional to the actual gross weight (AGW) when hovering at arbitrary values of altitude and temperature, then it can be concluded that the ratio of EGW to AGW is a constant and the computer mechanization yields (EGW) = $k$ (AGW). Further, since this same mechanization is used for determining MAL, then the MAL calculated must have the same proportionality to actual available lift (AAL) or (MAL) = $k$ (AAL).

Since lift margin is given by $$LM = MAL - EGW$$

then $$LM = k\ (AAL) - k\ (AGW) = k\ (ALM)$$

$ALM$ = actual lift margin

In the computer mechanization, $k$ has been set equal to 1 for a "standard" rotor per handbook data. If an actual rotor were to differ from the "standard" rotor by 5 percent, then the lift margin computed would differ by 5 percent. The essence of the lift margin concept of the present invention is presented diagramatically in FIG. 2 wherein function A, indicated at 32, represents the computer mechanization which enables the calculation of maximum available torque at any altitude and temperature. The $Q_A$ calculation is accurate providing that $Q_{ms}$ is accurate. To verify the accuracy of $Q_{ms}$ and function A, $Q_A$ is measured at various altitudes and temperatures by topping the engine at these altitudes and temperatures and recording actual altitude, temperature and $Q_A$ at each topping. The altitude and temperature for each topping is then entered into the computer and $Q_{ms}$ is adjusted so that the observed value of $Q_A$ appears at the output of function A. These $Q_{ms}$ data are recorded. It is evident that if the values of $Q_{ms}$ so determined are constant and independent of altitude and temperature, then $Q_{ms}$ and function A are accurate, because function A, under these circumstances, is a mechanization which will yield the proper value of $Q_A$ with a constant $Q_{ms}$ input over the complete range of altitudes and temperatures that were encountered in taking the topping data.

Figure 2:
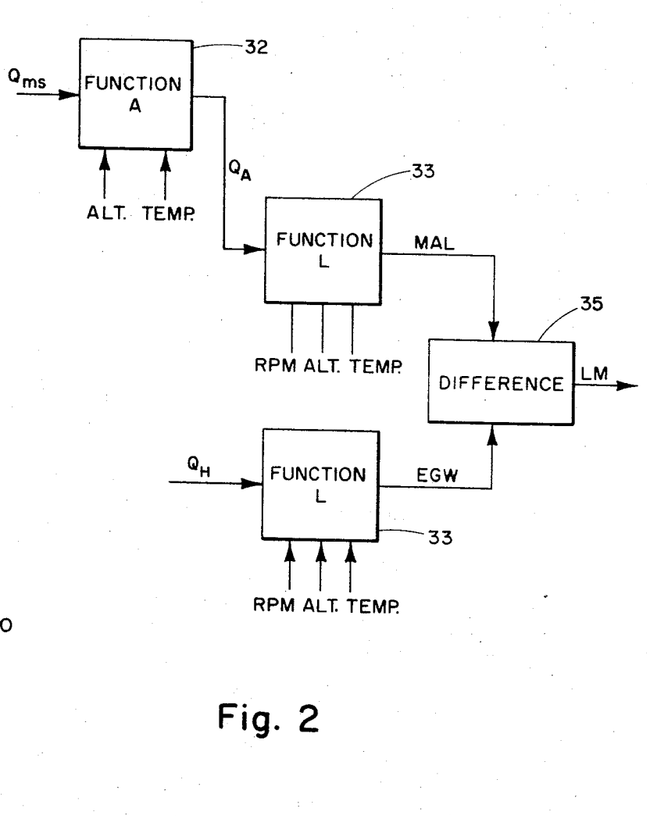
FIG. 2 is a block diagram illustrating the basic theory of the hover lift computer.

Function L, indicated at 33, represents the computer mechanization which enables the calculation of lifting force at hover as a function of the applied torque to the rotor transmission, engine rpm, altitude and temperature. In attempting to determine a mechanization for function L, it is assumed that no two helicopter rotor/transmission systems of the same type have the same efficiency. That is to say, a given torque applied to several different rotor/transmission systems of the same type under identical conditions of rpm, altitude, and temperature will not produce the same lifting force at hover. However, if function L is mechanized for a "midline" or "average" rotor/transmission system, it has been determined that the variation in lifting force so calculated is within a few percent of midline. For example, for a helicopter of gross weight W equipped with an "average" rotor/transmission system and measured for the engine torque required to hover, function L with the appropriate input parameters of hover torque ($Q_H$), altitude, rpm, and temperature would yield W as the lifting force at hover. Repeating the experiment with a less efficient rotor/transmission system, $Q_H$ would be greater and function L would yield a value greater than W. Correspondingly, a more efficient rotor/transmission system would yield an output of function L whose value would be less than W. However, if for one rotor/transmission system, a value of the output of function L which is proportional to the actual gross weight can be demonstrated over varying conditions of altitude and temperature, then the mechanization of function L is accurate since it yields an effective W which is consistently proportional to W and independent of altitude and temperature.

By now using the same function L to calculate the maximum available lift (MAL) by using $Q_A$ as the input torque, and subtracting from this value of MAL the effective gross weight at hover (by using $Q_H$ as the input torque) the difference, indicated at 35, is the additional effective weight that the helicopter is capable of hovering with, or, by definition, lift margin.

Lift margin, so computed, differs from the real additional weight that can be supported at hover by the percentage amount that EGW differs from the actual gross weight (a few percent). When lift margin, LM, approaches zero, the real additional weight that can be supported approaches zero also.

In general, all of the computing elements of the helicopter lift computer are based upon the use of conventional operational amplifiers to provide gain between a high-impedance input and a low-impedance output. This is based upon the assumption that the amplifier gain is infinite and that the input impedance is likewise infinite. Typical values for gain and input resistance are 50,000 and 5 megohms respectively, so that the approximations are usually justified. The operational amplifiers consists of silicon integrated circuits hermetically sealed in a TO-5 metal can.

The computer consists of four types of elements, input equipment in the form of thumbwheel resistors and circuitry which in some cases such as altitude processes the input data, internal computation elements such as the density converter which derives normalized density, $\sigma$, from static pressure, $P_s$, and outside air temperature, a digitizer which converts the analog signals of weight and torque to digital data for either memory storage or operator information, and display elements which present lift margin on an analog, preferably 2-inch round, D'Arsonval meter, and either effective dry weight, effective gross weight or maximum standard torque digitally via a seven-bar, light-emitting diode, numerical display.

The density ratio, $\sigma$, parameter is the ratio of the ambient air density to that of air at aircraft standard conditions. It is derived by means of the ratio of static pressure to absolute temperature, or $P_s/(OAT+273)$, by a straightforward operational-amplifier approach, wherein a voltage proportional to $P_s$ is applied to an amplifier whose gain is inversely proportional to absolute temperature. Density ratio is used in calculating lift from shaft horsepower.

The horsepower-to-lift converter operates on the assumption that the rotor is always operated at 100 percent speed, minor requirement in that weighing and topping are to be performed under this condition, and that lift margin is presumed to be based on this speed. In considering lift margin, it is unrealistic to assume any other speed. Of course, there is no requirement that fixed rotor speed be maintained except during weighing and topping. Thus, in all instances where power is the variable in describing the hover lift computer, reference is actually to torque or a multiple of torque.

In deriving the lift equation, data from the Operator's Manual for each craft is expressed in the "referred" form, i.e., each parameter is divided by the density ratio, $\sigma$. This approach allows the expression of data involving a number of different powers, altitudes and temperatures to be expressed in terms of a pair of variables, thus greatly facilitating the process of curve fitting, since the "curves" reduce to a single straight line. The variables of horsepower, atmospheric density ratio and lift for the UH-1B aircraft can be shown to be related as follows:

$$\text{Lift (lbs)} = M_o (\overline{HP})^{2/3} \sigma^{1/3} + b_o \sigma \quad (10)$$

where $M_o$ = constant and $b_o$ = constant

When equation (10) is written in terms of the referred parameters, it reduces to equation (11) as follows:

$$(\text{Lift}_{Ref}) = m_o (\text{Horesepower}_{Ref})^{2/3} + b_o \quad (11)$$

With this simplification, lift can be written by means of a Taylor's Series expansion as follows:

$$\text{Lift} = C_1 \overline{HP} + C_2 \sigma, \quad (12)$$

the referred aspect of the parameters having been removed by multiplying through by the density ratio, $\sigma$. While this expression for lift is not quite as precise as that which involves fractional powers of horsepower, it is linear, and so allows the computation to be made with linear circuit elements. Another feature of this approach is that it permits improvement of the accuracy by means of expansions about other values of referred horsepower, provided there is a means for selecting the best fit. The manner by which this selection is done is as follows. Equation (11) describes a function of unchanging sign of curvature (negative) —that is, it "curves down" everywhere. This means that when a number of tangents are fitted (Taylor's Series expansions), that line which best fits the curve will be the one which is lower. Consequently, a number of tangents may be fitted if there is a device to select the minimum.

In the hover lift computer the method just described is used with two tangents (Lift 1 and Lift 2) being fitted and selected by a discriminator (Lift Selector). If more than two tangents were required, any number of such approximations could be used. And to secure a better fit by means of secants, lines which actually intersect the curve of referred horsepower, the value of lift resulting from the selection of the optimum tangent can be reduced by an amount which in effect converts the tangents to secants.

It is noted that certain parameters of interest in helicopter operation have not been provided for in the hover lift computer. These include relative humidity, wind, and compressor inlet temperature (CIT). Relative humidity (RH) is a factor in the performance of reciprocating engines, but it is considered of negligible concern in the rating of gas turbines. Nor is it important in the computation of air density, because even at a temperature of 50°C the water vapor pressure at 100 percent RH is only 92 mmHg or 0.12 atmosphere. Of this fraction, the reduction in density is only that due to the fact that water vapor is lighter than air by 38 percent, resulting in an extreme contribution to density of 4.6 percent. Since density changes affect the lift equation by no more than about one-fourth their amount, it can be seen that relative humidity cannot affect lift calculations more than about 1 percent, falling to one-tenth this value at 30°C and 30 percent RH.

Every helicopter pilot is acutely aware of the effect of wind on the ability of his aircraft to take off or to hover over a given point on the ground. The moving air mass contributes something very much akin to translational lift, and so increases the available lift. However, the pilot is not provided with any quantitative data on wind, although some correction could be introduced into the system within the concept of the invention where a windspeed measurement or estimate is available. If this is desired, it appears advisable to convert windspeed to an equivalent lift and to enter this quantity by payload change thumbwheel 13.

Compressor inlet temperature is not measured on most aircraft. Thus, in the present invention outside air temperature is used instead even through CIT may be preferable. If CIT is instrumented in future aircraft, panel 11 could be used to display this parameter.

D'Arsonval meter 20, which is disabled during WEIGH and TOP functions, is of moderate but sufficient accuracy because the nature of the lift margin parameter is that of a difference and so does not require the same accuracy as the variables of weight and potential lift which are compared.

Where auxiliary, ungaged, fuel tanks are used, data on fuel consumption may be obtained from a fuel flowmeter. Alternatively, a torque-operated fuel-consumption computer could be provided to avoid the necessity of installing a fuel-flow transmitter. In such an event, the effective dry weight, $W_N$, would be the effective gross weight at the time of weighing and the displayed value of EGW would be the original weight less the sum of the fuel consumed as integrated from the fuel flowmeter. It is possible that fuel flow could be computed from all ready required data on torque, altitude and temperature, thus obviating the need for a fuel flowmeter. This would permit the computation of lift margin when operating with ungaged auxiliary fuel tanks.

If desired, an alarm circuit or circuits which would be actuated at selected margin levels for selected parameters could be provided, levels being easily settable to within 10 lb (10 millivolts). With such fixed or pilot-set alarms, the choice of display for the lift margin function could be based on other considerations.

Figure 3:
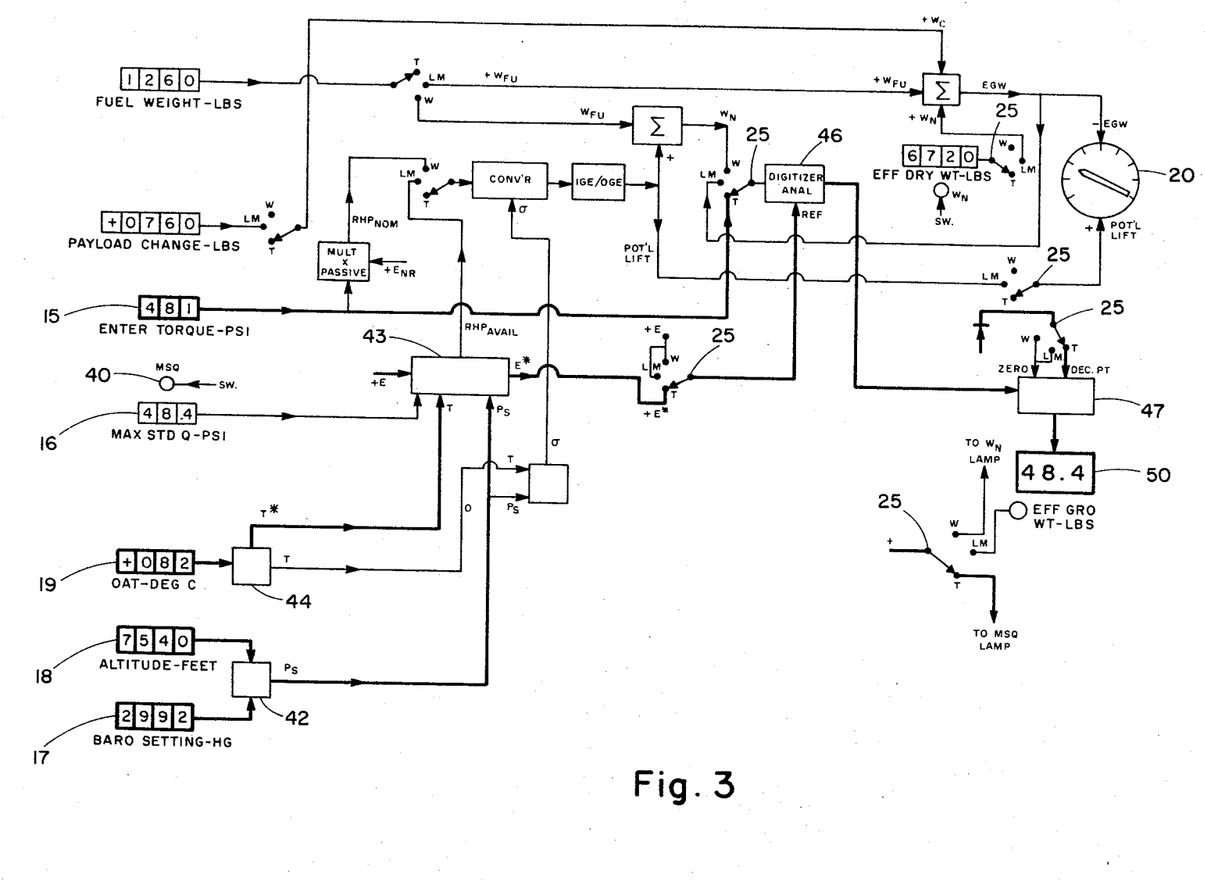
FIG. 3 is a block diagram of the switch positions and major input paths for determining maximum standard torque.
Figure 4:
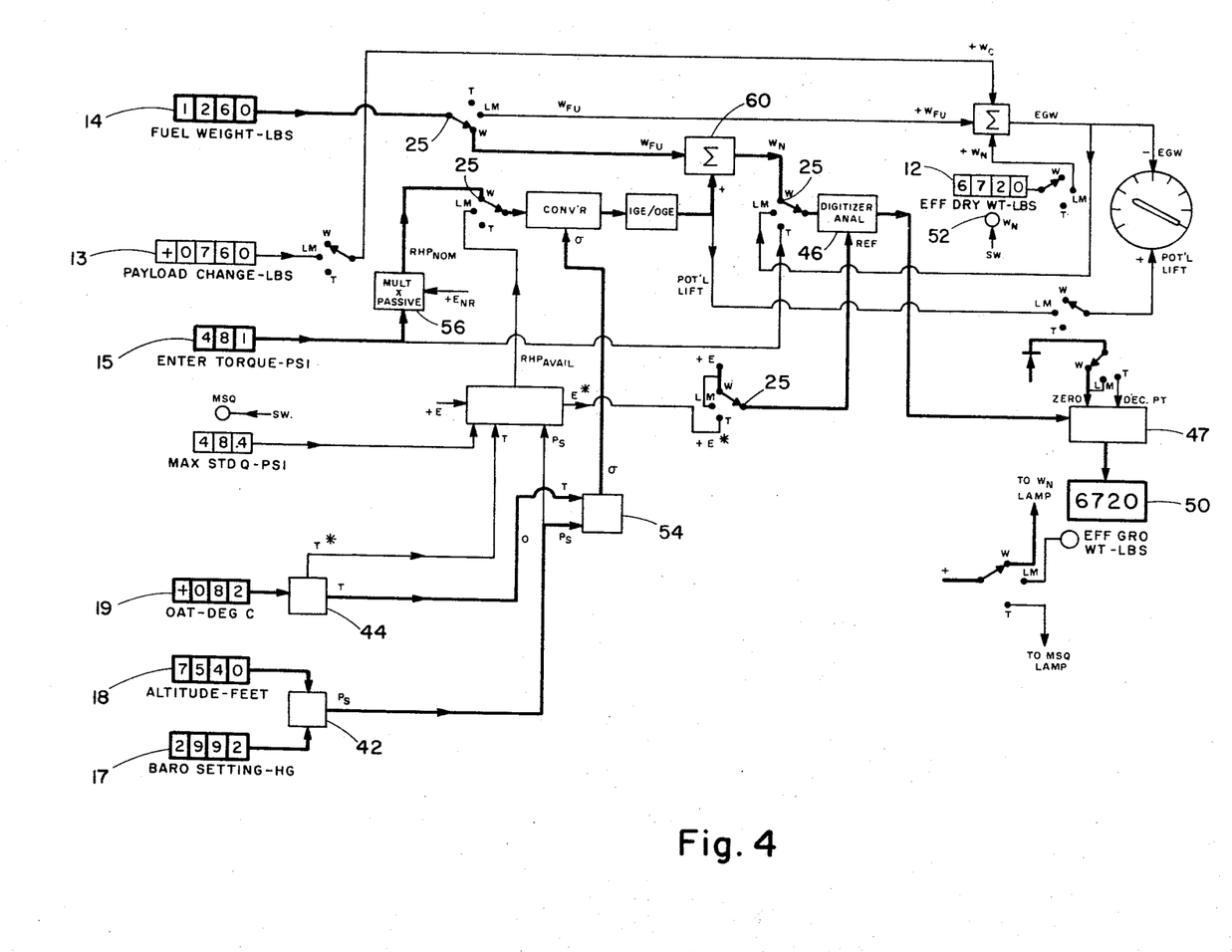
FIG. 4 is a block diagram showing the switch positions and major input paths for determining effective dry weight.
Figure 5:
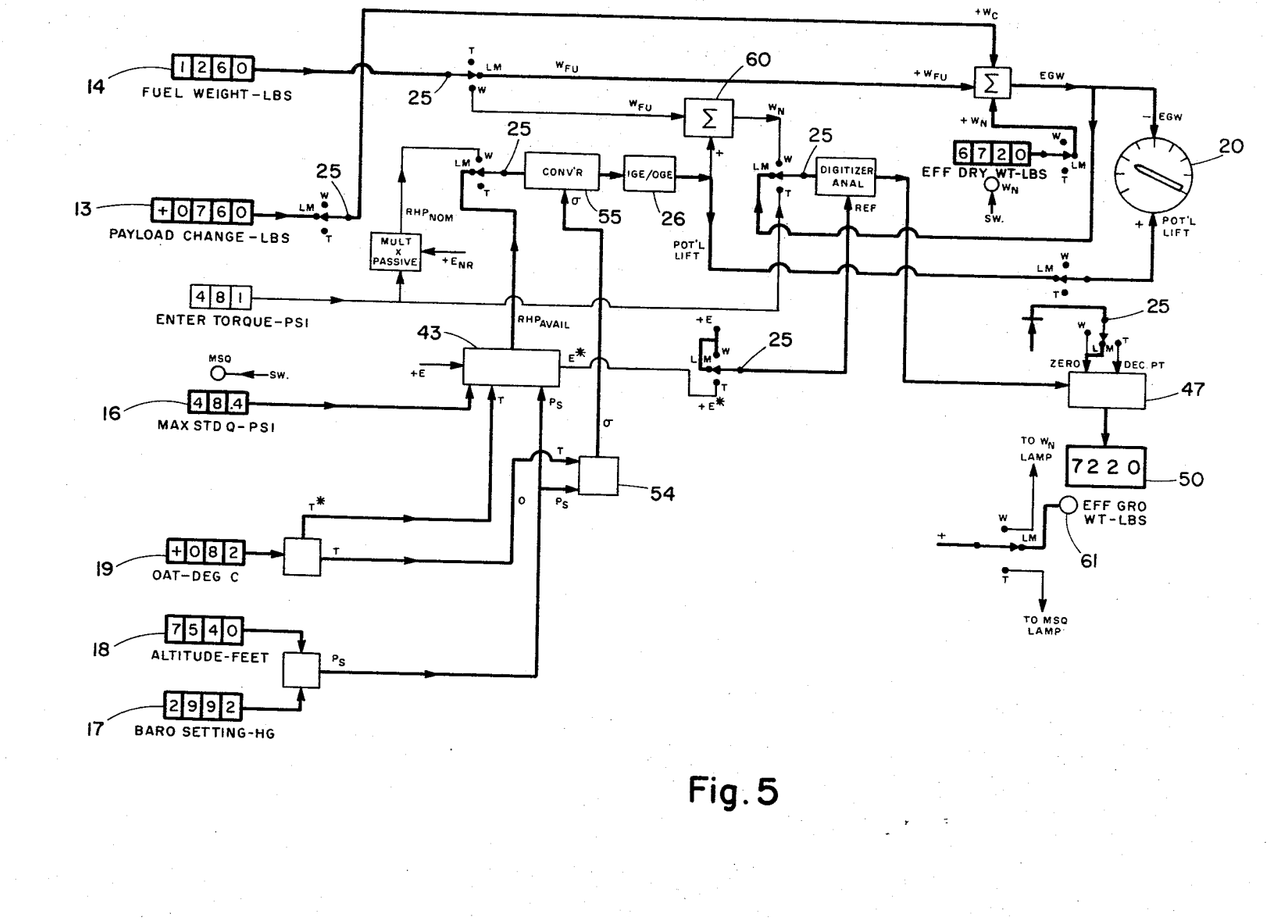
FIG. 5 is a block diagram showing the switch positions and major input paths for determining lift margin and for indicating lift margin and effective gross weight.

FIGS. 3, 4 and 5 are block diagrams which present the steps necessary in the determination of maximum standard torque, effective dry weight and lift margin/effective gross weight, respectively. In determining maximum standard torque, FIG. 3, a power cable is first connected to receptacle 27 and the ON-OFF switch is turned to ON. Function switch 25 is set to TOP and the IGE-OGE switch is set to OGE. A pilot light 40 above maximum standard torque thumbwheel 16 is lit and thereafter the helicopter altimeter setting is set into BARO SETTING thumbwheel 17 on panel 11. Next, the helicopter is flown to some convenient altitude above 500 feet and then is operated at that altitude which altitude is entered by the appropriate thumbwheel, 18. Altimeter converter 42 then computes the static pressure, $P_s$, which is inputted into the ambient correction and transmission limit section of the computer as indicated by block 43. This section also receives the observed air temperature from thumbwheel 19 after the observed temperature T has been corrected by a temperature converter 44 to present the effective engine torque temperature $T^*$. From 43, $E^*$ is obtained which is fed into the digitizer analyzer section as indicated at 46. This section also receives the maximum torque reading which is obtained by performing engine topping, with the value obtained entered via enter torque thumbwheel 15 and function switch 25. The output of the foregoing operations in relation to determining maximum standard torque is converted as indicated at 47 and digitally presented as indicated at 50. The computed value of maximum standard torque is then entered via maximum standard torque thumbwheel 16 for use in making the subsequent computations.

In FIG. 4, effective dry weight is determined by following the initial procedure as outlined in relation to FIG. 3 with the exception that function switch 25 is set to WEIGH and a pilot light 52 above effective dry weight thumbwheel 12 is lit. Thereafter, the altimeter setting is read and entered by BARO SETTING thumbwheel 17 after which the helicopter is flown to some convenient altitude above 500 feet and maintained constant for the balance of the operation with the chosen altitude entered at ALTITUDE thumbwheel 18. Outside air temperature is entered via the OAT thumbwheel 19, and the converted values of barometer setting and altitude and the converted value of temperature are inputed into the density converter section of the computer as indicated at 54. The converted density, $\sigma$, is fed to the HP/lift converter and minimum selection also receives the ENTER TORQUE from thumbwheel 15 after correction as indicated at 56. Next, the fuel weight is read and entered via fuel weight thumbwheel 14 whereupon the PAYLOAD CHANGE thumbwheel 13 is first read and noted and thereafter set at zero. The change in fuel weight $W_{FU}$ and the adjusted enter torque are then summed in an operational amplifier 60. The helicopter is brought to hover, and engine torque, outside air temperature, altitude and fuel weight are entered at the respective thumbwheels after which the effective dry weight is read from digital display 50 and entered via effective dry weight thumbwheel 12.

Referring to FIG. 5, the determination of hover lift margin and effective gross weight are now made by turning function switch 25 to LIFT MARGIN. A pilot light 61 under the digital readout of effective gross weight on panel 11 is lit and the previously obtained values of maximum standard torque and effective dry weight are entered at thumbwheels 16 and 12, respectively, if the values are acceptable. If the values are not acceptable, the steps outlined in relation to FIGS. 3 and 4 are repeated. Next, the acceptable value of payload change is entered at payload change thumbwheel 13, and again, if this value is not acceptable, the steps outlined in relation to FIG. 4 are repeated until a zero result is displayed. The helicopter altimeter reading and the selected altitude are now entered at the BARO SETTING and ALTITUDE thumbwheels, respectively. The outside air temperature at which lift margin and effective gross weight are desired is then determined and entered at the OAT thumbwheel 19. The value of fuel weight at which lift margin and effective gross weight are desired is then entered at fuel weight thumbwheel 14. The lift margin is now read on the lift margin indicator 20, and the effective gross weight is now read at 50 and on the digital readout 21. If different values of lift margin and effective gross weight are desired for other selected parameters, the thumbwheel settings are changed to agree with the desired conditions and then the operation is repeated. IGE-OGE switch 26 is set at IGE when the lift margin in ground effect is to be displayed. Operations in relation to TOP and WEIGH determinations are always performed out of ground effect, i.e., with the switch in the OGE position.

Figure 6:
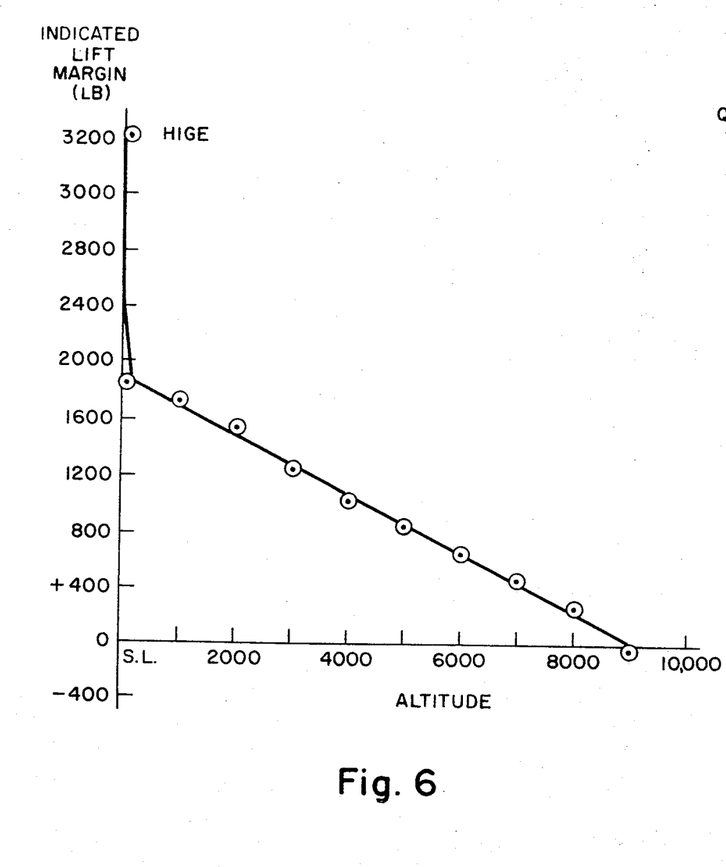
FIG. 6 is a graph of indicated lift margin versus altitude.

After the $Q_{ms}$ and EGW constants had been determined on a flight and entered into the computer, 500 lbs of ballast weight was added to the aircraft and entered into the computer. The computer predicted zero lift margin at 4,000 feet, and in the subsequent flight the pilot was just able to hover at 4,000 feet. At 6,000 feet the computer predicted negative lift margin and the pilot was unable to hover, experiencing a negative R/C at 6,000 feet. At 2,000 feet, the computer predicted positive lift margin and the pilot was able to maintain a positive R/C while hovering at 2,000 feet. FIG. 6 presents a plot of lift margin versus altitude generated from flight data taken on a subsequent flight but using the same constants for $Q_{ms}$ and EGW as were determined above. The flight data shows zero lift margin at 9,000 feet which was verified by the pilot.

The present invention thus persents a valuable aid in the use of helicopters where marginal lifts are encountered, for example, in rescue operations where speed is critical as well as in military operations where speed obviously is essential. The helicopter pilot is enabled by the invention to be constantly aware of his lift margin and the effective gross weight of the helicopter, which information permits a pilot to know within a few pounds what weight he may transport from one area to another and whether the weight may be carried to higher altitudes without losing lift and also whether the helicopter if not fully loaded at a lower altitude may be flown to a higher altitude and there have additional weight taken aboard. The invention also accounts for the variations in lift margin and effective gross weight which are a function of temperature, keeps a running account of decreasing fuel weight and payload change and in these and other aspects provides for a much more refined and closely calculated helicopter operation wherein critical lift margin may be continually identified.

The system of the invention is also applicable to other aircraft since the helicopter lift margin system operates basically as a comparison between the maximum available lift and the effective gross weight of a given craft. Since both of these elements depend upon the ability to derive lift from power, the calculation of lift, therefore, need only be made applicable to the mathematical model of another aircraft and then the system need only to be rearranged to interface properly with the other aircraft. That is, the data required by the system must be available in any aircraft in which it is desired to be used.

It can be demonstrated that the equations for the UH-1B aircraft are similar to those for the CH46D and CH53A helicopters which are very different types of craft since the latter have two motors, two engines and more than twice the gross weight of the UH-1B. Thus, it is apparent that the mathematical relationship chosen to implement lift from power in the present application is one which is generally applicable to several and probably all, helicopters. This holds because the method of computation in the present system is related generally to lift, power and the non-linear effects such as transmission limit which are common to all helicopters. There is nothing in the present method which is specific to a particular aircraft, it is only the coefficients and, in some cases, the extent of modeling, as in engine power dependence upon temperature, which differs among aircraft. It is thus emphasized that the helicopter lift margin system of the present invention is generally applicable to all rotary-wing aircraft. The invention can also be used as a maintenance air for monitoring engine condition by frequently checking maximum standard torque.

What is claimed is:

1. A method of determining continuously in flight by onboard computer the lift margin or additional weight that a helicopter may hover with based upon entering certain parameters into the computer which are measured at the time the helicopter is caused to perform certain maneuvers comprising:

ascertaining and recording the maximum available torque said engine can provide under standard conditions of 29.921 in g Hg pressure and a temperature of 150°C by topping maneuver;

ascertaining and recording the effective gross weight of the helicopter by a hover or low speed cruise maneuver;

ascertaining and recording the force necessary to lift the helicopter under varying conditions of rpm, altitude and temperature;

ascertaining and recording the maximum available lift of the helicopter by using a theoretical and empirical expression for determining maximum available lift under varying conditions of rpm, altitude and temperature using maximum standard torque;

applying said expression to values of said maximum available torque to determine maximum available lift at selected altitudes and temperatures;

applying said expression to values of lifting force to determine the effective gross weight at said selected altitudes and temperatures; deriving the lift margin at said selected altitudes and temperatures by determining the difference between said values of maximum available lift and effective gross weight; and continuously displaying said values of maximum available lift and effective gross weight to the helicopter pilot.

2. The method as defined in claim 1 wherein the steps of applying said expression are performed by the same computer circuitry, whereby errors introduced by said same computer circuitry are canceled out in the determination of said difference of values.

3. The method as defined in claim 2 wherein the effective gross weight (EGW) of the helicopter is computed by a second expression as follows:

$$EGW = K_6 K_7 NO_w + K_8(P/P_o)(K_3 + K_4 T)^{-1}$$

where $Q_w$ = torque at weighing in psi, $K_3 = 0.9469$, $K_4 = 0.003472$, $K_6 = 0.00352$, $N$ = engine rpm, $P$ = pressure in inches of Hg, $P_o$ = standard pressure of 29.921 in. Hg, $T$ = temperature in °C, and $K_7$ and $K_8$ are 6.493 and 2225 respectively for changes in weight/changes in pressure ratios of from about 40 to about 58, and 7.639 and 1325 respectively for said ratios of from about 62 to about 100.

4. The method as defined in claim 3 wherein maximum standard torque is determined by a topping maneuver wherein the normal maximum allowable air speed at substantially the gross helicopter weight is noted at a desired test altitude after which the helicopter is accelerated to said air speed in level flight and then climbed at no greater speed until a 3 percent loss of rpm due to load on the engine is ascertained at which point the parameters of engine torque, outside air temperature and altitude are recorded; and means in said computer for converting said recorded parameters of temperature and pressure to said standard conditions.

5. The method as defined in claim 4 wherein EGW is determined by a cruise maneuver at 30 knots with data therein obtained modified to hover at zero airspeed by a third expression as follows:

$$(EGW)_H = 1/(1-b)\ (EGW)_{30} + [(EGW)_{30}/AGW)(L_{TO}/(1-b)) - K_1\ (HP)_{pa+}]$$

where $b = 0.08725$, $L_{TO} = 1,904$, $AGW$ is the actual gross weight at any time and $K_1$ (HP) par is negligible at 30 knots so that $$(EGW)_H = 1.0956\ (EGW)_{30} + 1431.1$$

6. A helicopter lift margin indicator for a helicopter having an onboard computer comprising:

means for generating a standard voltage E proportional to the hydraulic pressure indicated by torquemeter gage at the time of topping of a helicopter whose lift margins are to be obtained and modified to standard ambient conditions;

means for generating a voltage T proportional to the outside air temperature at the time of said topping and the effect of said temperature on engine torque;

means for generating a voltage proportional to the altitude of the helicopter at the time of said topping;

means for generating a voltage proportional to the barometric pressure corresponding to the altitude at which the lift margin is to be determined;

means for converting said altitude and barometric pressure voltages into a voltage $P_s$ representing the effective static pressure for the conditions of altitude and barometric pressure;

means for generating a reference voltage E* by modifying E proportionally according to the parameters T and $P_s$ which reference voltage represents the maximum standard torque under the stated conditions; and means for digitally displaying said maximum standard torque;

whereby the helicopter operator may note the appropriate value of maximum standard torque and enter said value into said computer to assist in determining additional parameters.

7. The system as defined in claim 6 and further including means for combining T and $P_s$ into a voltage $\sigma$ representing normalized air density;
means for limiting E to representative values at which engine torque may be transmitted mechanically with safety;
means for converting said limited E voltage representing psi to a voltage proportional to lift in lbs at said normalized air density;
means for correcting said lift for ground effect;
means for generating a voltage $W_{FU}$ proportional to the weight of fuel on board;
means for summing lift in lbs and fuel weight $W_{FU}$ to determine the effective dry weight $W_N$ of the helicopter under the stated conditions; and
means for digitally displaying said effective dry weight in lbs.

8. The system as defined in claim 7 and further including means for converting said values of T, $P_s$ and maximum standard torque to a voltage proportional to available rotor horsepower expressed in psi,
said available rotor horsepower converted to lbs at the stated conditions in said means for converting;
said rotor horsepower in lbs corrected for ground effect in said means for correcting;
means for summing $W_N$, $W_{FU}$ and payload change in lbs to determine the effective gross weight EGW of the helicopter under the stated conditions;
means for combining EGW and E to determine lift margin LM in lbs under said stated conditions; and
means for displaying said values of EGW and LM continuously to the pilot,
whereby the pilot may know immediately the additional load the helicopter may assume and may obtain the LM and EGW at other locations by inserting appropriate parameters into the computer.

* * * * *